United States Patent [19]

Chung

[11] 4,407,835
[45] Oct. 4, 1983

[54] LEAVENING SYSTEM IN FRUCTOSE CONTAINING BAKED GOODS

[75] Inventor: Frank H. Y. Chung, Norwalk, Conn.

[73] Assignee: Stauffer Chemical Company, Westport, Conn.

[21] Appl. No.: 290,448

[22] Filed: Aug. 6, 1981

[51] Int. Cl.³ ............................................. A21D 10/04
[52] U.S. Cl. .................................... 426/552; 426/658; 426/561
[58] Field of Search ............... 426/553, 653, 561, 551, 426/562.3

[56] References Cited

U.S. PATENT DOCUMENTS

| | | | |
|---|---|---|---|
| 2,297,630 | 9/1942 | Milligan | 426/563 |
| 2,930,698 | 3/1960 | Barch et al. | 426/653 |
| 3,397,064 | 8/1968 | Matz | 426/551 |
| 4,250,202 | 2/1981 | Hartnett | 426/553 |

*Primary Examiner*—Raymond N. Jones
*Assistant Examiner*—Elizabeth A. Hatcher
*Attorney, Agent, or Firm*—Paul J. Juettner

[57] ABSTRACT

A leavening acid system for the production of baked goods useful in overcoming the difficulties such as browning and uneven color associated with the use of reducing sugars and particularly fructose in baked goods.

15 Claims, No Drawings

LEAVENING SYSTEM IN FRUCTOSE CONTAINING BAKED GOODS

BACKGROUND OF THE INVENTION

The present invention relates to leavening acid systems for the production of baked goods and in particular baked goods containing fructose and particularly high fructose corn syrup.

DESCRIPTION OF THE PRIOR ART

Due to the high cost of sucrose, many large users have looked to alternative sources of sweetening agents. Corn syrup, a readily available material, has long been used in the baking area but its sweetening power was insufficient to act as a direct replacement for sucrose. Corn syrup has been modified to increase the sweetening level, such as by treating the corn syrup with glucose isomerase enzyme, to increase the fructose content of the syrup. High fructose corn syrup is being used by many industries without any problems, in such high sucrose use areas as soft drinks.

Another potential large sucrose use area is bakery goods. High fructose corn syrup has not found as extensive a use in that area due to certain problems attendant its use. High fructose corn syrup, when used as a direct replacement for sucrose, can cause undue browning. While this presents no problem for a chocolate cake, the undue browning is unacceptable in sponge cake, yellow cake or white cake. The same would be true of any other light-colored baked goods such as sweet doughs, donuts, rolls and the like wherein the product might be used. This is particularly true of those baked goods prepared using chemical rather than yeast leavening systems.

It has also been noted that high fructose corn syrup has a tendency to reduce volume in cakes where chemical leavening is the primary source of leavening. The texture of a cake can also be adversely affected making it crumbly and unacceptable.

Since it does not appear that the price of sucrose, in the near future, will diminish, high fructose corn syrup will be used more frequently by the industry. There is a need to provide means for using this material as well as other fructose materials to provide effective baked goods and particularly effective cakes.

BRIEF SUMMARY OF THE INVENTION

In accordance with the present invention, it has been found that the difficulties in using high fructose containing materials in baked goods, particularly cakes, can be overcome by using, as the leavening acid for a leavening system in fructose containing baked goods, a blend of a slow-acting phosphate leavening acid having a 2 minute donut dough rate of reaction between about 15% and about 35% $CO_2$ and a 10 minute donut dough rate of reaction of between about 20% and about 60% $CO_2$ in combination with an organic acid selected from the group consisting of fumaric acid, citric acid, malic acid, tartaric acid, lactic acid, succinic acid, adipic acid and mixtures thereof. Preferably the phosphate leavening acid is anhydrous monocalcium phosphate, specially treated to retard its solubility, alkali metal aluminum phosphate, acidic or mixtures thereof with the anhydrous monocalcium phosphate, calcium compounds or trivalent aluminum compounds. Most preferably the phosphate leavening acid is the anhydrous monocalcium phosphate. The preferred organic acid is fumaric acid and the preferred sucrose of the fructose is high fructose corn syrup. The leavening acid is also useful in baked goods which do not contain fructose.

Detailed Description of the Present Invention

The present invention relates to the preparation of baked goods and particularly baked goods containing the monosaccharide fructose or, as it has been more commonly known, levulose. The fructose can be provided in the baked goods by the addition of pure fructose or by the addition of sugar blends containing fructose. The more important commercially available source is high fructose corn syrup. This material is generally prepared by reacting corn syrup with a glucose isomerase enzyme to convert part of the glucose to fructose. ;p The term high fructose corn syrup as used herein refers to corn syrup in which the solids content is a minimum of at least 30% by weight fructose (levulose), the remainder being chiefly dextrose and a small amount (less than 10%) of higher saccharides, chiefly maltose. The water content can vary but usually ranges from about 20% to about 30% by weight. The mineral content is small, usually less than about 1% by weight. A typical high fructose corn syrup contains 29% water and 71% solids. The solids consist substantially of about 42% fructose, about 52% dextrose, about 6% high saccharides, chiefly maltose, and about 0.05% minerals. Another product (77% solids) contains about 55% fructose, about 42% dextrose and about 3% higher saccharides. A corn syrup of 80% total solids, about 90% fructose, about 9% dextrose and about 1% higher saccharides is also known. The composition can be changed by changing the degree of isomerization of the corn syrup.

Also included in the present invention is honey and crystalline fructose, preferably liquid honey. Honey has the following composition (average of 490 samples of liquid honey—Table 1, page 11, "Composition of American Honey", United States Department of Agriculture Research Technical Bulletin 1N-2b):

| Ingredients | % by Weight | |
|---|---|---|
| | Normal Moisture Basis | Solids Calculated to a Dry Basis |
| Water | 17.2 | |
| Fructose | 38.19 | 46.20 |
| Dextrose | 31.28 | 37.71 |
| Sucrose | 1.31 | 1.58 |
| Maltose | 7.31 | 8.83 |
| Higher Saccharides | 1.5 | 1.81 |
| Ash | 0.17 | 0.20 |
| Nitrogen | 0.04 | 0.05 |
| Undetermined | 3.0 | 3.62 |

Liquid honey is comparable with high fructose corn syrup in fructose content. In addition, liquid honey contains a quantity of sucrose and nitrogen or protein. The quantity of dextrose in high fructose corn syrup is appreciably higher than that in liquid honey.

The high fructose corn syrup and/or the liquid honey can also be used in a dry form. These materials can be dried by the use of soy protein or starch additives as disclosed in U.S. Pat. Nos. 3,718,484, 3,833,413 and 3,906,114. The disclosures of these patents are hereby incorporated by reference.

As used herein, the term fructose containing material is intended to include high fructose corn syrups, liquid honey, crystalline fructose and mixtures thereof in liquid or dry form.

The fructose or fructose containing material can be used as the sole sweetening agent in the baked good. However, it has been found that better results are obtained utilizing the fructose or fructose containing material in an amount sufficient to replace up to 75% (from about 1% to about 75%) and, more preferably, in the range of from about 30% to about 55% of the sucrose. Since fructose is sweeter than sucrose, the relative sweetening capabilities of the materials replaced must be kept in mind in determining the amount utilized. Since the preferred high fructose corn syrup has a sweetening capacity equal to about 170% of sucrose, this material is generally used in a ratio of 30:60 high fructose corn syrup:sucrose. Since the amount of color darkening increases with increasing amounts of fructose, the use of less than 100% replacement is suggested.

The present invention can be used in any type of baked good which is leavened by a chemical leavening system. A chemical leavening system includes a gas-generating alkali such as sodium bicarbonate and a neutralizing acid. The leavening acid for the leavening system of the invention comprises a slow-acting phosphate leavening acid having a 2 minute donut dough rate of reaction between about 15% and about 35% evolved $CO_2$ and a 10 minute donut dough rate of reaction between about 20% and about 60%. A particularly preferred type of phosphate leavening acid is anhydrous monocalcium phosphate which has been treated to retard its solubility (one method being discussed hereinafter), which has a neutralizing value of between 80 and 85. This leavening acid has a 2 minute rate of reaction of between about 17% and 25% $CO_2$ and a 10 minute rate of reaction of between about 55 and 60% $CO_2$ evolved when tested in a donut dough rate of reaction test at 27° C. This test procedure involves reacting the acid with sodium bicarbonate while the reactants are suspended in a moist donut dough at a temperature of 27° C. plus or minus 0.5° C. The proportions of acid and bicarbonate employed are those which are capable of theoretically liberating 200 cc of $CO_2$ gas at 0° C. The remainder of the ingredients are outlined in a paper on Reaction Rate Testing which appeared in Cereal Chemistry, Vol. 8, American Association of Cereal Chemists, St. Paul, Minn., 1931, pp. 423-33.

The anhydrous monocalcium phosphate for use in the present invention is prepared by dehydrating monocalcium phosphate in the presence of certain ions which contribute to the formation of a thin, continuous coating of relatively insoluble phosphate on the surface of the monocalcium phosphate. The continuous coating delays the dissolution of the anhydrous monocalcium phosphate when contacting aqueous liquids. This provides an initial delay in leavening action. This product is described more fully in U.S. Pat. No. 2,160,232. Methods for its manufacture are described in U.S. Pat. Nos. 2,160,700 and 2,462,104. The disclosure of these 3 patents is incorporated herein by reference. As used herein, the term anhydrous monocalcium phosphate is intended to refer to a heat-treated or coated anhydrous monocalcium phosphate. A product of this type is available from Stauffer Chemical Company under the trademark V-90. It is intended that heat treated monocalcium phosphate as used herein not be limited to the particular method as discussed hereinbefore. Any procedures which prepare a product with the reaction rate given before are considered included.

Other phosphate leavening acids which can be used include alkali metal (sodium, potassium or mixtures thereof), aluminum phosphate, acidic, such as sodium aluminum phosphate, acidic, hereinafter SALP, acidic. SALP, acidic, was first disclosed in U.S. Pat. No. 2,550,490, and an early baking powder composition incorporating SALP was disclosed in U.S. Pat. No. 2,550,491. U.S. Pat. No. 2,550,490 specifically discloses a SALP with a Na:Al:PO$_4$ under ratio of 1:3:8. A dehydrated SALP is disclosed in U.S. Pat. No. 2,957,750; a 3:3:8 SALP in U.S. Pat. No. 3,223,479; and 3:2:8 SALP in U.S. Pat. No. 3,501,314; a 2:3:6 SALP in U.S. Pat. No. 3,574,536; an amorphous SALP in U.S. Pat. No. 2,995,421; a 3:3:9 SALP in U.S. Pat. No. 3,726,962 and the continuous crystallization of SALP in U.S. Pat. No. 3,311,448. These materials can be used provided their leavening rates fall within the limits set out hereinbefore.

SALP, acidic, is used in baking powders, self-rising mixers, preleavened pancake flours and mixes, prepared biscuit mixes, and prepared cake mixes. (See U.S. Pat. No. 2,550,491, 3,109,738, 3,041,177, 3,096,178).

The speed of the gas developing reaction of the sodium aluminum phosphate can be accelerated by the use of an accelerator such as monocalcium phosphate which may be formed on the surface of the sodium aluminum phosphate crystals (U.S. Pat. No. 2,550,490).

The flow characteristics of SALP can be improved and the dusting reduced by SALP agglomerated or pelletized as, for example, in U.S. Pat. No. 3,620,972, or by the use of various binders such as sugars or flow control agents such as colloidal $SO_2$ or tricalcium phosphate.

In connection with SALP 3:2:8 disclosed in U.S. Pat. No. 3,501,314, a flow conditioner such as an alkali or alkaline earth metal phosphate, calcium hydroxide or aluminum oxide can be blended therewith.

A sodium aluminum phosphate molecule can be modified with the introduction of potassium to decrease hygroscopicity (U.S. Pat. No. 3,255,073). The potassium is explained as replacing hydrogen atoms in the crystalline lattice of the sodium aluminum phosphate.

The flow characteristics of the previous potassium modified sodium aluminum phosphate can be improved by incorporating the potassium ions in a solvent suspension of an alkanol (U.S. Pat. No. 3,411,872).

A further improvement over U.S. Pat. No. 3,205,073 is disclosed in U.S. Pat. No. 4,054,678 wherein a specific ratio of sodium and potassium, obtained by the controlled substitution of potassium for a portion of the sodium, is used to prepare a potassium modified SALP product. The improved SALP product is characterized by increased density and reduced dusting properties. This product is available from Stauffer Chemical Company under the trademark "Levair".

The handling of SALP, acidic, has also been improved by contacting a SALP slurry with a calcium compound prior to drying as disclosed in U.S. Pat. No. 4,196,226. Calcium sulfate has been added to SALP as disclosed in U.S. Ser. No. 972,097, filed Dec. 21, 1978. The disclosures of all the aforementioned patents is hereby incorporated by reference.

SALP, acidic has also been blended with up to 10% of an edible salt yielding trivalent aluminum such as aluminum sulfate as disclosed in U.S. Pat. No. 3,041,177, the disclosure of which is incorporated herein by reference. A blend containing about 93.5% SALP, acidic (prepared by process of U.S. Pat. No. 4,054,678) and 6.5% aluminum sulfate is available from Stauffer Chemical Company under the trademark BL-60.

Also usable as the leavening acid in the present invention is a blend of SALP, acidic and a coated anhydrous monocalcium phosphate of reduced solubility as disclosed in U.S. Pat. No. 3,109,738, the disclosure of which is incorporated herein by reference.

A product comprising from about 30 to about 80% SALP and from about 70 to about 20% coated anhydrous monocalcium phosphate can also be used. A product comprising 67% SALP, acidic (prepared by the process of U.S. Pat. No. 4,054,578) and 33% coated anhydrous monocalcium phosphate is available from Stauffer Chemical Company under the tradename "actif-8". This leavening acid can be incorporated into flour to prepare a self-rising flour and can be used in that form.

The preferred leavening acids for use in the present invention include the products identified hereinbefore as V-90, Levair, BL-60 and actif-8. More preferably, the leavening acid is V-90 and blends of V-90 with SALP, acidic, such as actif-8. The most preferred type of phosphate leavening acid is anhydrous monocalcium phosphate identified hereinbefore as V-90.

The organic acids useful in the invention can be any food-grade organic acid selected from the group of fumaric acid, citric acid, malic acid, tartaric acid, lactic acid, succinic acid, adipic acid and mixtures thereof. Preferably, the acid is selected from the group of fumaric acid, citric acid and malic acid. The preferred organic acid is fumaric acid. The so-called "cold water soluble" fumaric acid can also be used.

The leavening acid is used in an amount sufficient to provide the necessary leavening for the final product (comparing its neutralizing value against sodium bicarbonate). These quantities are well known or easily determined by one skilled in the art. The organic acid is used in an amount sufficient to provide a neutral to slightly alkaline pH. The organic acid is generally used in an amount ranging from about 2% to about 30% relative to the phosphate leavening acid. Preferably the organic acid is used in an amount ranging from about 8% to about 15% relative to the phosphate leavening acid.

It is pointed out that these acids give varying degrees of results. Lactic acid, for example, provides good color but poor quality cake due to its known deleterious effect on gluten. Addition of a base material may aleviate the cake quality problem when using lactic acid to some extent while suffering some darkening in color. Tartaric acid may provide a darker but more uniform color than the cakes prepared with phosphates alone.

The present invention can be used in any type of baked good which is chemically leavened. The invention is particularly useful in baked goods which contain a reducing sugar such as fructose as a sweetener. By "containing fructose" is meant that a baked good contains at least about 10% fructose based on the weight of the flour. By "containing fructose" is also meant that a portion of the sucrose requirement has been replaced with the monosaccharide and preferably at least 20% of the sucrose requirement has been replaced with a monosaccharide preferably fructose. Preferably the recipe contains at least about 20% to about 45% of the monosaccharide fructose on a flour basis. Compositions of this type include cakes (yellow, white, sponge, chocolate, and specialties such as carrot, banana and the like), sweet doughs, brownies, cookies, pound cake, frozen dough, and the like. The baked goods which would find extensive use of the present invention generally include cakes as well as the specialty cakes including carrot and banana types, brownies and pound cake. Also included would be the instant single package type of cake mixes for snack cakes presently finding popularity in the market place. While highly colored cakes such as chocolate cake do not suffer from a recognizable darkening effect, the benefits of improved volume and texture are of equal importance to these products.

The present invention is applied to the baked goods by including the fructose-containing material in a formulation in a manner similar to sucrose as presently being accomplished. The same would be said of the use of the leavening system. Both the phosphate and organic acid would be used or added to the ingredients of the baked good at the time normally used in adding the acid phosphate leavener. Nothing has been noted that requires any particular change in mixing or baking procedures.

It has also been noted that the replacement of 100% of the sucrose requirement in a baked good with high fructose corn syrup solids such that the quantity for fructose in the recipe exceeds 45% based on the flour basis, may cause certain difficulties, such as excessive crust crumb browning, small cake volume, and coarse crumb texture. No difficulties occur in replacing up to 75% of the sucrose with high fructose corn syrup. High fructose corn syrup can be utilized in an amount of up to 100% replacement by the addition of from about 0.5 to about 2.0% of a surfactant such as anionic or non-ionic food emulsifiers including mono- and di-glycerides of $C_{12}$ to $C_{22}$ saturated fatty acids derived from animal or vegetable fat, lactylated monoglycerides, mixtures of fatty ester of sorbitol and sorbitol anhydrides and the hydrated form of the above emulsifiers.

The improved results of the invention can also be obtained using blends of corn syrup and high fructose corn syrup, high fructose corn syrup and sucrose, high fructose corn syrup and fructose or high corn syrup solids and honey or combinations thereof. If desired, part of the sweetening effect can be replaced with an artificial sweetener to lower the caloric content.

Following examples are illustrative of the invention and are not to be regarded as limiting.

EXAMPLES

Yellow layer cake was prepared with a 50% replacement of the sucrose with high frustose corn syrup from the following formulation:

|  | 1 | 2 | 3 | 4 | 5 | 6 | 7 | 8 | 9 | 10 |
|---|---|---|---|---|---|---|---|---|---|---|
| Cake flour | 100 | " | " | " | " | " | " | " | " | " |
| Sucrose | 120 | 60 | " | " | " | " | " | " | " | " |
| HFCS[1] | — | 84.6 | " | " | " | " | " | " | " | " |
| Shortening[2] | 45 | " | " | " | " | " | " | " | " | " |
| NFDM (Super heat) | 8.75 | " | " | " | " | " | " | " | " | " |
| Eggs | 50 | " | " | " | " | " | " | " | " | " |

-continued

|  | 1 | 2 | 3 | 4 | 5 | 6 | 7 | 8 | 9 | 10 |
|---|---|---|---|---|---|---|---|---|---|---|
| Salt | 3.75 | " | " | " | " | " | " | " | " | " |
| Baking Powder[3] | 6.75 | " | — | — | — | — | — | — | — | — |
| Anhydrous Monocalcium phosphate | — | — | 2.08 | " | " | " | " | " | " | " |
| Levair ® (SALP) | — | — | — | — | — | — | — | — | 2.08 | 2.08 |
| Fumaric Acid | — | — | — | 0.31 | — | — | — | — | — | 0.21 |
| Citric Acid | — | — | — | — | 0.31 | — | — | — | — | — |
| Malic Acid | — | — | — | — | — | 0.31 | — | — | — | — |
| Tartaric Acid | — | — | — | — | — | — | 0.31 | — | — | — |
| Lactic Acid | — | — | — | — | — | — | — | 0.31 | — | — |
| Sodium Bicarbonate[4] | — | — | 1.88 | " | " | " | " | " | " | " |
| Vanilla | 2.14 | " | " | " | " | " | " | " | " | " |
| Water | 95 | 70 | " | " | " | " | " | " | " | " |

Footnotes to the formulation table.
[1]Cornsweet 42, Archer Daniel Midland, 71% solids, 42% fructose.
[2]Emulsified Shortening
[3]Fleischmann's double acting baking powder.
[4]The amount of sodium bicarbonate was equivalent to an 82 neutralizing value.

PROCEDURE

1. Sift all dry ingredients. Blend the dry ingredients with shortening, liquid ingredients and ⅔ of the water in a Hobart ™ C-100 with a paddle for 3 minutes at low speed.
2. Mix for 5 minutes at medium speed. Scrape.
3. Add remaining water, mix ½ minute at low speed and 3 minutes at medium speed.
4. Add ½ of the liquid eggs and mix ½ minute at low speed. Scrape. Then mix 3 minutes at medium speed.
5. Add remaining liquid egg and mix ½ minute at low speed and 3 minutes at medium speed.
6. Scale 300 grams of batter into greased, lined 17.5 centimeter (7 inch) pan. Bake at 190° C. (375° F.) for 25-27 minutes.
7. Cool for 15 minutes on rack and depan. Cool for an additional 30 minutes before evaluating.

The cakes were evaluated for specific volume using the rape seed method, pH, Agtron Color Index using the all sucrose cake as base of 100, visual color and texture. The following results were obtained.

TABLE

| Example No. | Sugar Source | Leavening System | Sp. Vol. |
|---|---|---|---|
| 1 | Sucrose | Baking Powder | 3.58 |
| 2 | Sucrose HFCS (50/50) | Baking Powder | 3.45 |
| 3 | Sucrose HFCS (50/50) | An. MCP/Soda | 3.63 |
| 4 | Sucrose HFSC (50/50) | An. MCP/Soda/ Fumeric Acid | 3.52 |
| 5 | Sucrose HFCS (50/50) | An. MCP/Soda/ Citric Acid | 3.43 |
| 6 | Sucrose HFCS (50/50) | An. MCP/Soda/ Malic Acid | 3.40 |
| 7 | Sucrose HFCS (50/50) | An. MCP/Soda/ Tartaric Acid | 3.50 |
| 8 | Sucrose HFCS (50/50) | An. MCP/Soda/ Lactic Acid | 3.32 |
| 9 | Sucrose HFCS (50/50) | Levair (SALP)/ Soda | 3.67 |
| 10 | Sucrose HFCS (50/50) | Levair (SALP)/ Soda/Fumaric Acid | 3.55 |

| Example No. | Cake pH | ACI | Crumb Color Appearance |
|---|---|---|---|
| 1 | 8.02 | 100.0 | Golden Yellow |
| 2 | 7.49 | 77.5 | Dark Yellow |
| 3 | 7.42 | 94.3 | Golden Yellow, Sl. Dark Portion at Bottom |
| 4 | 6.94 | 102.3 | Golden Yellow |
| 5 | 6.98 | 95.7 | Golden Yellow, Sl. Dark Portion at Bottom |
| 6 | 7.03 | 95.7 | Golden Yellow, Sl. Dark Portion at Bottom |
| 7 | 7.30 | 87.6 | Sl. Dark Yellow |
| 8 | 7.03 | 102.3 | Golden Yellow, but very crumbly small volume |
| 9 | 7.21 | 83.3 | Slight Dark Crumb |
| 10 | 6.88 | 93.8 | Very Slight Dark Portion at Bottom |

As can be seen from the preceding data, a yellow cake with 50% of the sucrose replaced with high fructose corn syrup has a lower specific volume, lower pH and very dark color as compared to the all sucrose control. The use of anhydrous monocalcium phosphate improves color as well as specific volume and pH. However, the cake is still unacceptable. The use of fumaric acid with the anhydrous monocalcium phosphate provides a cake with color and specific volume equivalent to the all sucrose control. The use of soluble organic acids such as citric, malic, tartaric and lactic do not provide cakes as acceptable as when fumaric acid is used in the system of the invention.

The use of tartaric acid provides a slightly darker but uniform color which may be desirable and no significant problem depending on the specification of product in which it is used. Lactic acid gave good color but the cake was crumbly due to the known interaction of that acid with gluten. Adjustment of the pH to 7-7.5 may overcome part of the crumbly texture but possibly at the expense of color.

What is claimed is:

1. A process for preparing chemically leavened baked goods which comprises utilizing, as the leavening acid in a bicarbonate leavening system in a cake formulation containing monosaccharide, a blend of a slow-acting phosphate leavening acid having a 2 minute donut dough rate of reaction of between about 15% and about 35% evolved $CO_2$ and a 10 minute donut dough rate of reaction of between about 20% and about 60% evolved $CO_2$ in combination with an organic acid selected from the group consisting of fumaric acid, citric acid, maleic acid, tartaric acid, succinic acid, adipic acid and mixtures thereof and baking said cake.

2. The process as recited in claim 1 wherein said phosphate leavening acid is selected from the group consisting of coated anhydrous monocalcium phosphate, alkali metal aluminum phosphate, acidic, calcium modified alkali metal aluminum phosphate, acidic, mixtures of alkali metal aluminum phosphate and an edible compound providing trivalent aluminum and mixtures thereof.

3. The process as recited in claim 1 wherein said phosphate is a member selected from the group consisting of coated anhydrous monocalcium phosphate, alkali metal aluminum phosphate, acidic and mixtures thereof.

4. The process as recited in claim 1 wherein said phosphate leavening acid is coated anhydrous monocalcium phosphate.

5. The process as recited in claims 2 or 4 wherein said organic acid is fumaric acid.

6. The process as recited in claim 1 wherein said baked goods contain the monosaccharide fructose.

7. The process as recited in claim 1 wherein said baked goods contain high fructose corn syrup.

8. The process as recited in claim 1 wherein the organic acid is used in an amount of from about 2% to about 30% relative to the phosphate leavening acid.

9. The process as recited in claim 8 wherein the organic acid is used in an amount of from about 8% to about 15% relative to the phosphate leavening acid.

10. In a cake normally containing from about 100% to about 200% sucrose based on the weight of the flour, the improvement which comprises replacing up to 75% of the sucrose with a fructose containing composition having at least 30% fructose, and using as the leavening acid in a bicarbonate leavening system a blend of a member selected from the group consisting of anhydrous monocalcium phosphate, alkali metal aluminum phosphate, acidic, calcium modified alkali with aluminum phosphate, acidic, mixtures of alkali metal aluminum phosphate and an edible compound providing trivalent aluminum and mixtures thereof in combination with fumaric acid.

11. The cake as recited in claim 10 wherein said phosphate is a member selected from the group consisting of coated anhydrous monocalcium phosphate, alkali metal aluminum phosphate, acidic and mixtures thereof.

12. The cake as recited in claim 10 wherein said member is coated anhydrous monocalcium phosphate.

13. The cake as recited in claim 10 wherein said fumaric acid is used in an amount of from about 2% to about 30% relative to the amount of phosphate leavening acid.

14. The cake as recited in claim 10 wherein said fumaric acid is used in an amount of from about 8% to about 15% relative to the amount of phosphate leavening acid.

15. In a cake normally containing from about 100% to about 200% sucrose based on the weight of the flour, the improvement which comprises replacing up to 75% of the sucrose with a fructose containing composition having at least 30% fructose, and using as the leavening acid in a bicarbonate leavening system a blend of a member selected from the group consisting of anhydrous monocalcium phosphate, alkali metal aluminum phosphate, acidic, calcium modified alkali with aluminum phosphate, acidic, mixtures of alkali metal aluminum phosphate and an edible compound providing trivalent aluminum and mixtures thereof in combination with an organic acid selected from the group consisting of fumaric acid, citric acid, malic acid, tartaric acid, succinic acid, adipic acid and mixtures thereof.

* * * * *

UNITED STATES PATENT AND TRADEMARK OFFICE
CERTIFICATE OF CORRECTION

PATENT NO. : 4,407,835
DATED : October 4, 1983
INVENTOR(S) : Frank Hsin Y. Chung It is certified that error appears in the above-identified patent and that said Letters Patent are hereby corrected as shown below:

Col. 2, line 5, change "Detailed Description of the Present Invention" to "DETAILED DESCRIPTION OF THE PRESENT INVENTION".

Col. 2, line 17, the phrase "The term high ..." should start a new paragraph.

Col. 5, line 48, change "aleviate" to "alleviate".

Col. 7, at about line 4, change "Baking Powder$^3$ 6.75" to "Baking Powder$^3$ 6.25".

Col. 7, at about line 15, change "Water 95" to "Water 94".

Signed and Sealed this

Thirteenth Day of December 1983

[SEAL]

Attest:

GERALD J. MOSSINGHOFF

Attesting Officer

Commissioner of Patents and Trademarks